United States Patent [19]
Murthy et al.

[11] Patent Number: 6,092,169
[45] Date of Patent: *Jul. 18, 2000

[54] APPARATUS AND METHOD FOR STORAGE SUBSYSTEM DRIVE MOVEMENT AND VOLUME ADDITION

[75] Inventors: Purna C. Murthy, Houston; Mark J. Thompson, Spring, both of Tex.

[73] Assignee: Compaq Computer Corporation, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/832,367

[22] Filed: Apr. 2, 1997

[51] Int. Cl.$^7$ .................................................. G06F 12/02

[52] U.S. Cl. .............................. 711/170; 711/114; 714/6; 714/7; 361/685

[58] Field of Search ................................. 711/114, 170; 395/182.04, 182.05; 361/685

[56] References Cited

U.S. PATENT DOCUMENTS

| | | | |
|---|---|---|---|
| 5,369,758 | 11/1994 | Larson et al. | 395/182.05 |
| 5,479,653 | 12/1995 | Jones | 395/111 |
| 5,574,851 | 11/1996 | Rathunde | 395/182.05 |
| 5,751,936 | 5/1998 | Larson et al. | 395/182.05 |
| 5,822,782 | 10/1998 | Humlicek et al. | 711/170 |

*Primary Examiner*—Hiep T. Nguyen
*Attorney, Agent, or Firm*—Fletcher, Yoder & Van Someren

[57] ABSTRACT

In a computer system there is a storage subsystem and an array controller circuit controlling an array of hard drives in the storage subsystem. Upon powering the storage subsystem, the array controller automatically determines whether the hard drives have been moved to new bay locations in the storage subsystem and whether a new complete logical drive, consisting of at least one hard drive, has been added to the storage subsystem. Upon discovery of any drive movement or logical drive unit addition, the array controller automatically reconfigures each hard drive by at least updating the configuration information in accordance with the changes.

13 Claims, 6 Drawing Sheets

APPARATUS AND METHOD FOR STORAGE SUBSYSTEM DRIVE MOVEMENT AND VOLUME ADDITION

BACKGROUND OF THE INVENTION

1. Field of the Invention

The present invention relates to computer systems that incorporate array controllers and storage subsystems. More particularly, the present invention relates to array controllers adapted to allow rearrangement and automatic reconfiguration of hard disk drives within a storage subsystem without storage loss. The rearrangement of hard disk drives includes, but is not limited to, the rearrangement of hard drives within a storage subsystem and/or the addition of one or more logical drive units into a storage subsystem.

2. Description of the Related Art

A drive array is simply a collection of hard disk drives or physical drives which are grouped together to create an array of physical drives. An array is made up of one or more subsets called logical drives (sometimes called logical volumes) which are spread across one or more physical drives in the array. Operating systems view logical drives as a single, contiguous storage space although it may be made up of several physical drives.

Figure 1:
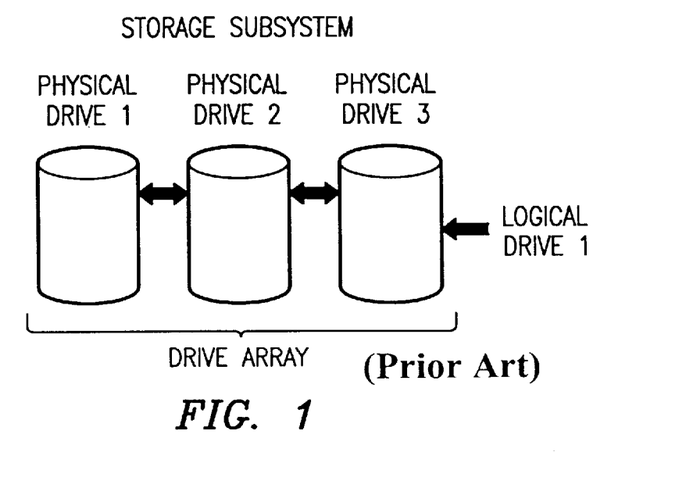
FIG. 1 is an example of a generic drive array.
Figure 2:
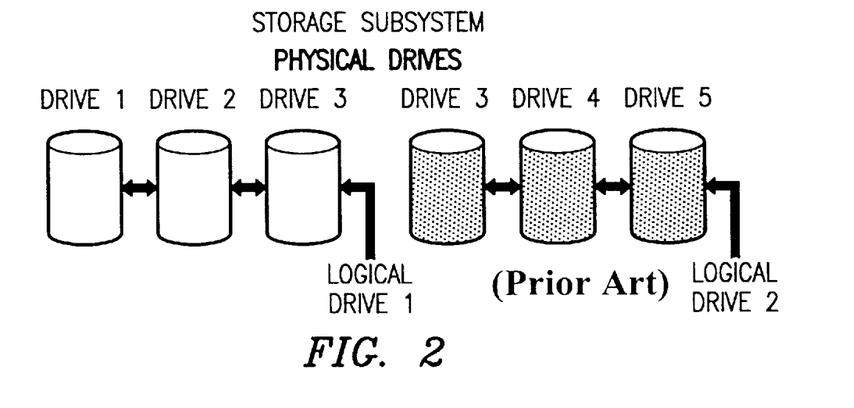
FIG. 2 is another example of a generic drive array.
Figure 3:
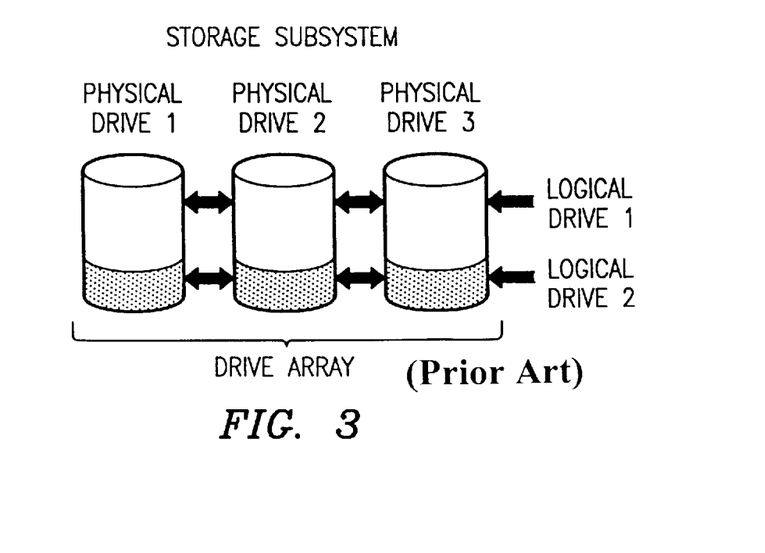
FIG. 3 is another example of a generic drive array.

A generic drive array contained in a storage subsystem is illustrated in FIG. 1 and consists of one logical unit spread across three physical drives. FIGS. 2 and 3 illustrate other drive array configurations found within a storage subsystem. In particular, FIG. 2 illustrates a storage subsystem having six physical drives that are configured to be one drive array having two logical drives. FIG. 3 illustrates a storage subsystem consisting of one drive array consisting of three physical drives wherein there are two logical drives spread across the three physical drives. One of ordinary skill in the art will understand that there are many ways to configure one or more drive arrays found within a storage subsystem or subsystems.

SUMMARY OF THE INVENTION

It is an object of the present invention to provide a storage subsystem having a plurality of hard drives with the ability to be able to determine, upon power-up, whether the hard drives have been rearranged within the various hard drive positions within the storage subsystem and further to be able to automatically reconfigure the hard drives in the storage subsystem in accordance with any repositioning that may have occurred.

It is a further object of the present invention to provide a storage subsystem and an array controller wherein the storage subsystem has a plurality of hard drives configured into a first order and wherein the first order includes a logical drive unit such that the array controller is adapted to determine whether a new logical drive unit has been added to the storage subsystem and adapted to automatically reconfigure all the drives in the storage subsystem to a second order.

BRIEF DESCRIPTION OF THE DRAWINGS

These and other objects and advantages of this invention will become apparent and more readily appreciated from the following description of the presently preferred exemplary embodiments, taken in conjunction with the accompanying drawings, of which.

DETAILED DESCRIPTION OF THE PREFERRED EXEMPLARY EMBODIMENTS OF THE PRESENT INVENTION

Figure 4:
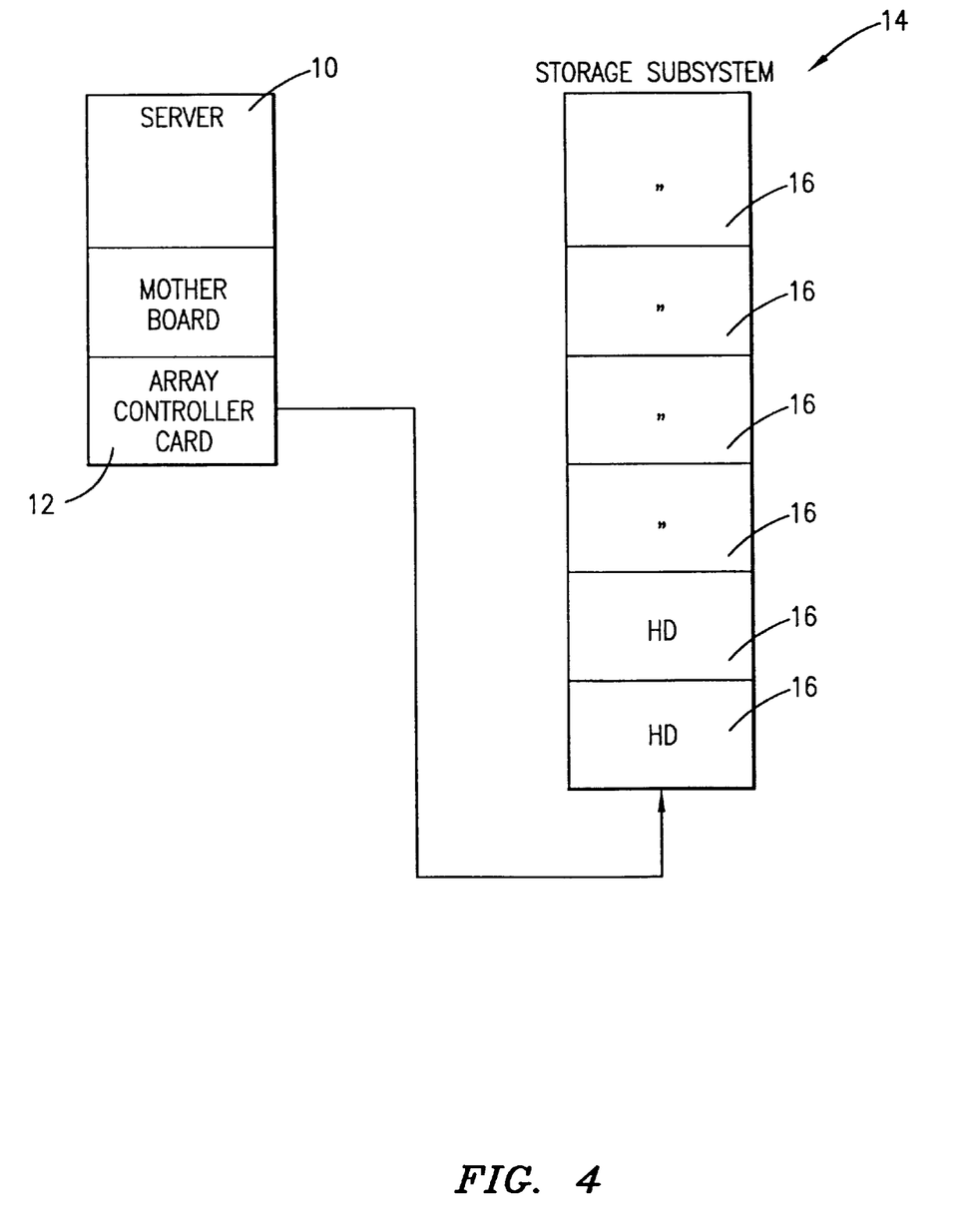
FIG. 4 is an example of an array controller connected to a drive array.

An array controller is generally used to control and/or configure one or more drive arrays to which the array controller is connected. An array controller can be connected to a network server, a personal computer, or to a variety of other types of computer systems. Referring to FIG. 4 a portion of a computer system is shown wherein a server is depicted. A server generally comprises a central processing unit (CPU), a mother board, a monitor, etc.

The server 10 in FIG. 4 comprises among other things an array controller 12 of the present invention. The array controller 12 can be a circuit incorporated into the motherboard of the server 10 or a separate circuit card(s) or subsystem. The array controller 12 can be designed to handle various types of data and data transfer configurations such as EISA, PCI, SCSI, IDE, IPI, etc. These types of data transfers and busses are well known in the art of designing array controller circuitry.

The array controller 12 is connected to a storage subsystem 14. The storage subsystem 14 can be located within the server 10 or in a separate unit. Generally, the storage subsystem 14 comprises a plurality of hard drives 16. The hard drives 16 are placed in "bays" or slots. The storage subsystem 14 shown in FIG. 4 has six bays. Thus, as many as six physical drives 16 can be installed into the storage subsystem 14. The hard drives 16 can of various available sizes for example 1 gigabyte, 4 gigabyte, 9 gigabyte, etc.

Using the array controller 12 the entire storage subsystem can be configured to be a single logical unit or the physical drives can be configured such that the first two drives are one logical unit and the next four drives are a second logical unit. A logical unit (logical drive unit) is when one or more hard drives, or portions of hard drives, act like a single hard drive.

Figure 5:
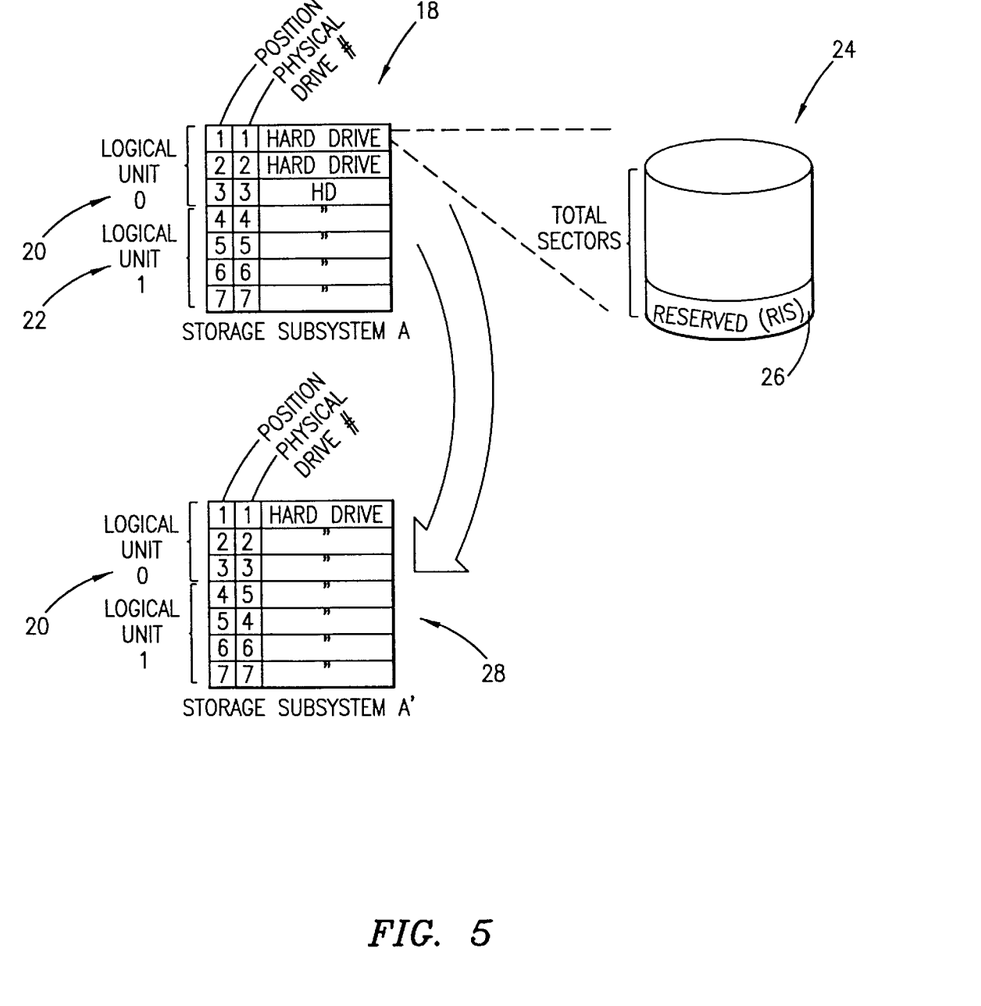
FIG. 5 is a block diagram and breakout view of a storage subsystem.

FIG. 5 depicts a diagram and breakout view of a storage subsystem. The storage subsystem 18 depicted in FIG. 5 depicts one of the aspects of the present invention. Storage subsystem A 18, for example, is a seven physical drive storage subsystem wherein logical unit 0 20 comprises physical drives one through three and logical unit 1 22 comprises physical drives four through seven.

The physical drives can be hard drives, laser rewritable drives, tape drives or any rewritable storage media of choice. In the preferred exemplary embodiment the physical drives are hard drives.

A breakout view of physical drive one 24 is shown. Referring now to the breakout view, one can refer to a hard drive in terms of how much data storage space is available. A hard drive can be broken down into storage areas called sectors. So, for example, a hard drive may comprise 30,000 total sectors. A hard drive may have a portion of the hard drive specifically reserved to store important system information. In the preferred embodiment the reserved portion 26 of each physical hard drive is 1088 sectors large and comprises the first 1088 sectors of the hard drive 24. It is understood that the reserved area 26 can be a variety of sizes and located anywhere on a hard drive or other substantially equivalent device for storing data information. In the exemplary embodiment the reserved area 26 is referred to as reserved information sectors (RIS).

The RIS 26 is where the configuration information of the physical drives and logical units is stored. The configuration information is created by the array controller 12 and stored in the RIS 26 of each physical drive. The RIS 26 can include a variety of types of information which can include, but is not limited to: performance information, fault tolerance information, hardware topology information, physical drive number, position number, logical unit relationship information, and which logical drive(s) each physical drive belongs to.

Each of the physical drives in a storage subsystem 14 of an exemplary embodiment is configured to have a substantially identical RIS 26 except for the physical drive number and position number information.

A first exemplary embodiment of the present invention is an array controller 12 which is adapted to allow the physical drives within a storage subsystem 14 to change position (move to different drive bays) and automatically reconfigure the RIS 26 of the drives without software interacting with a user.

Referring now to storage subsystem A 18 of FIG. 5 and storage subsystem A' 28 and to FIG. 4, suppose physical drives four and five were removed from the storage subsystem A 18 and then replaced into storage subsystem A in the wrong physical positions thereby creating storage subsystem A' 28. The array controller 12 of the exemplary invention will recognize that the drive positions of the physical drives have changed within the storage subsystem 18/28/14. The array controller 12 recognizes the drive movement by reading the RIS 26 of each of the drives when powering up the system. The RIS 26 will indicate that the drive numbers have changed with respect to the drive positions. Firmware in the exemplary array controller 12 will automatically reconfigure the storage subsystem 14 such that the RIS 26 of each physical drive correctly reflects the relationship between drive position and drive number.

The present exemplary embodiment is capable of reconfiguring a storage subsystem 14 regardless of how the physical drive numbers have been shuffled among the positions (bays) in the storage subsystem. Furthermore, the present exemplary embodiment is capable of reconfiguring the storage subsystem 14 regardless of how the logical units are divided among the physical drives of the storage subsystem.

For example, if the storage subsystem is originally configured to have six physical drives configured be a combination of FIG. 1 and FIG. 3 such that the first three positions and drive numbers comprise logical unit 0 and the remaining three drives and positions comprise logical units one and two wherein logical units one and two each use an equal part of the three remaining drives, each of the six drives will have the same RIS with possibly the exception of drive number and drive position information.

Suppose the drives are swapped or shuffled while the power to the storage subsystem is off. That is, suppose that the drives numbered 1,2 and 3 are placed in positions 5, 2 and 3 respectively and that the drives numbered 4, 5, and 6 are place in positions 4, 6, and 1 respectively. When the power is returned to the storage subsystem, the array controller of the present exemplary embodiment will read the RIS of each of the drives and determine that the physical positions of the drives has changed. The RIS will provide the array controller with the appropriate relationship between the drives prior to shuffling the drives. With this information the firmware associated with the exemplary array controller is adapted to reconfigure the hard drives in the storage subsystem to have a correct relationship after the shuffling has taken place. The RIS portion of each of the drives will be reconfigured (at least the table of drive-positions for each logical drive is updated)by the array controller without requiring direction or intervention from a user (network administrator, a human). Thus, the resulting storage subsystem will have logical unit 0 in positions 5, 2, and 3 respectively; and logical units 1 and 2 in positions 4, 6 and 1 respectively.

The inventors of the present invention understand that, to date, many storage subsystems require that logical drives always ascend physical positions within a storage subsystem. That is, a logical drive can be ordered in positions 1, 3, and 7 respectively, but not ordered in positions 3, 1 and 7, respectively, because the positions are not in ascending order. Thus, another aspect of an exemplary embodiment of the present invention, is that the firmware within an exemplary array controller determines whether the physical position of the drives that make up the logical units are in ascending order after they have been shuffled. If they are not in ascending order the exemplary embodiment may inform the user (system administrator, a human) that the order is unacceptable. The software may also inform the system administrator how to remedy the situation. That is, the computer system may inform the system administrator how to move the hard drives around in the positions of the storage subsystem in order to conform with the industry standard of requiring that the drives associated with a logical unit be positioned in ascending order within the bays positions of a storage subsystem.

Figure 6:
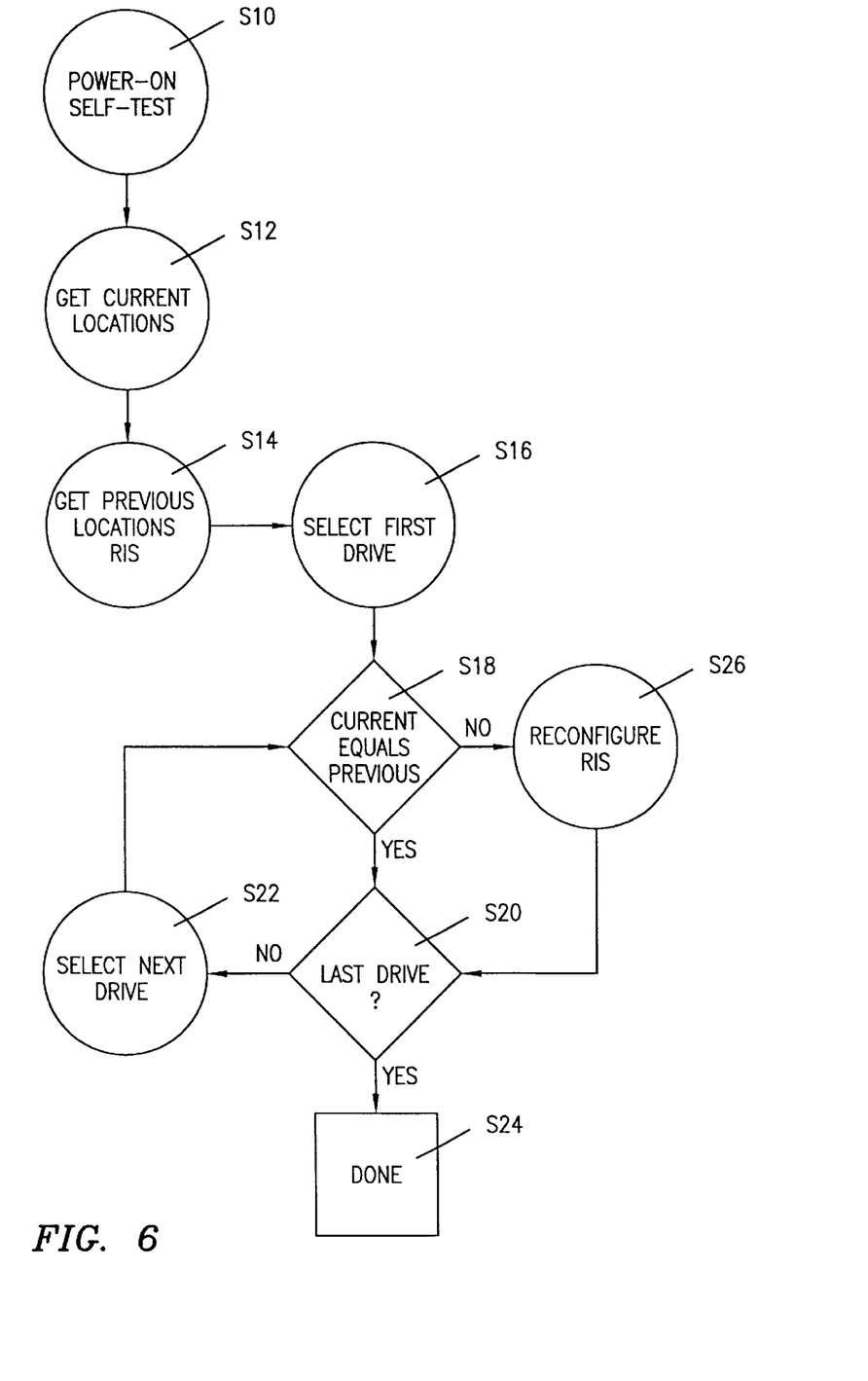
FIG. 6 depicts a flow chart reflecting off-line drive movement of an exemplary embodiment of the present invention.

FIG. 6 depicts a flow chart indicating the basic step by step logic of the firmware associated with the array controller of the present exemplary embodiment. In step S10 power is returned to the storage subsystem and/or the array controller circuitry and a power-on self-test is performed by the array controller. In step S12 the array controller reads the current positions of each of the drives located in an associated storage subsystem. The array controller then reads the RIS (the reserved portion of each physical drive) to determine what the previous positions of each of the drives were prior to powering down the storage subsystem and/or the array controller in step S14. Note that other processing steps may be performed between reading the RIS and checking the drive number, such processes include, but are not limited to, performing a consistency check or performing an update counter check, etc.

In step S16 the array controller begins to look at the first position and hard drive number located in the first position. In step S18 the firmware determines whether the physical drive located in the first position is the same drive that was in the first position prior to powering down the storage subsystem and/or the array controller. If the present drive number is the same as the previous drive number then step S20 is executed and the firmware determines if the present drive position (position one) is the last position having a hard drive in it. If it is not the last drive (i.e., if more drives need to be looked at) the firmware begins to look at the next drive (the drive in position two). Again, a determination is made as to whether the drive in position two is the same drive that was in position two prior to the power being removed. If for example, the drive in position two is not the drive that was in position two, then the RIS of all the drives will need to be reconfigured to correct the discrepancy in step S26.

Once all the drives have been looked at, then the firmware updates and reconfigures the RIS portions of all the disks to indicate the correct correlation of the logical units, drive numbers and drive positions of all the hard drives within the storage subsystem.

It is understood that one of ordinary skill in the art could create a variety of software algorithms to accomplish the task of determining where the drives where located prior to powering down and then up the storage subsystem and/or array controller and comparing that information with where the drives are located after powering the storage subsystem and/or array controller back up and then updating or reconfiguring the drives according to any changes that may have occurred automatically. Such techniques include, but are not limited to, storing a copy of the drive number, drive serial number, drive location and logical unit association information in a non-volatile memory associated with the array controller and then comparing the data in the non-volatile memory with the locations of the drives after power is returned to the system and reconfiguring the system as necessary. Thus, the present invention includes a means for determining whether the drives in the storage subsystem have been rearranged and a means for reconfiguring the drives automatically and without the loss of non-configuration data from the drives.

Another aspect of an exemplary embodiment of the present invention allows one or more new logical drive units to be added to a storage subsystem such that when the storage subsystem and its associated array controller are powered up, the drives in the storage subsystem are automatically reconfigured without human intervention. In other words, the firmware of the array controller circuitry automatically recognizes that a new logical drive unit has been added to the storage subsystem and then reconfigures the storage subsystem (e.g. updates the configuration information) to incorporate the new logical drive unit. This aspect of the invention is referred to as volume addition, and in particular off-line volume addition.

Figure 7:
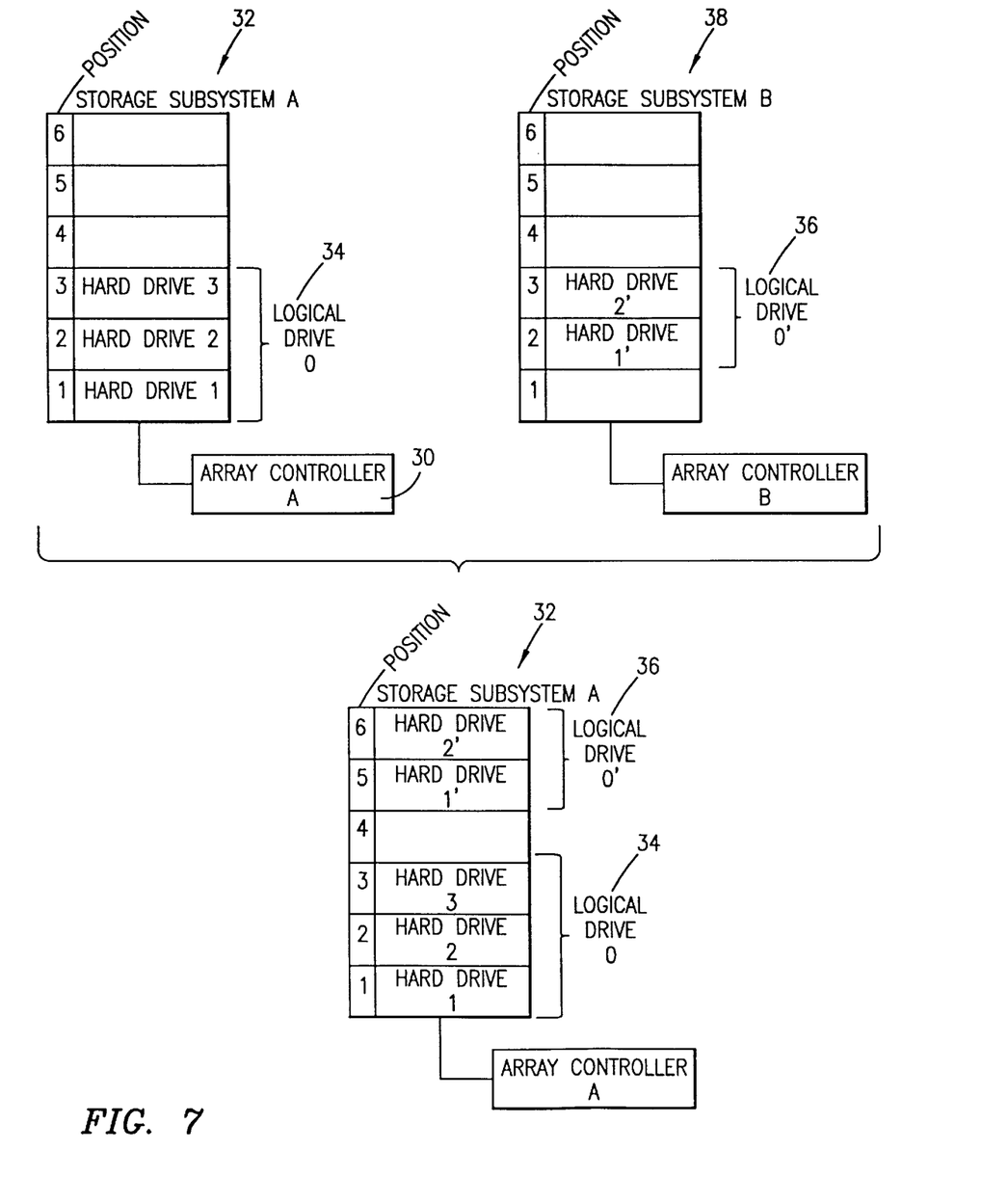
FIG. 7 depicts a block diagram of off-line volume movement of an exemplary embodiment of the present invention.

Referring to FIG. 7, a situation incorporating aspects of the present exemplary embodiment is depicted. An array controller A 30 is connected to storage subsystem A 32. Storage subsystem A 32 is configured to have a single logical drive unit 0 34 consisting of hard drives 1, 2, and 3. Hard drives 1, 2, and 3 are positioned in bays 1, 2, and 3 respectively. Furthermore, a second logical drive unit, logical drive 0' 36, is located in storage subsystem B 38. Logical drive 0' 36 consists of hard drives 1' and 2'. Furthermore, hard drives 1' and 2' are positioned in bays 2 and 3 of storage subsystem B 38. Storage subsystem B 38 is connected to array controller B.

Suppose, for example, for some reason a system administrator wants to combine logical drive unit 0 34 and logical drive unit 0' 36 into a single storage subsystem. In accordance with the present exemplary embodiment of the present invention, the system administrator merely needs power down storage subsystem A 32 and install the complete logical drive unit 0' 36 into any of the empty bays of storage subsystem A 32. This is shown in the lower portion of FIGURE A, wherein hard drives 1' and 2' are installed into bay positions 5 and 6 of storage subsystem A 32.

When the storage subsystem is powered-up, the array controller A 30 reads the reserved portions of each hard drive in the storage subsystem and determines that a new logical drive, logical drive unit 0' 36, has been added to the storage subsystem. The array controller A 30 then reconfigures the hard drives in the storage subsystem A 32 to include logical unit 0' 36. The reconfiguration by array controller A 30 is done automatically when the power is turned on.

Again, prior to the logical drive movement of logical drive unit 0' 36 from storage subsystem B 38 to storage subsystem A 32, the original RIS portion of each of the drives in logical drive unit 0 34 in storage subsystem A 32 were all identical except possibly for the data indicating drives number and drive position. Furthermore, the RIS portion of the drives in logical drive unit 0 34 indicate that there are no drives in storage subsystem bays 4, 5, and 6.

When the complete logical unit 0' 36 is added to storage subsystem A 32 and the storage subsystem A 32 is powered-up, the array controller A 30 will read the RIS portions of each of the drives present in storage subsystem A 30 and compare at least one of data indicating the ID of the array controller that wrote the RIS, the position data, the logical drive number, the drive number in the RIS portion of each of the drives with the drive's actual drive position data, and drive number information. With the comparison/validation complete, array controller A 30 can correctly reconfigure all the drives in storage subsystem A 32 to indicate the present drive position, drive number, and associated logical drive.

It is understood that this aspect of the present invention will work only if a complete logical drive is added to a storage subsystem. Furthermore, this aspect of the present invention will function properly if the logical drive being added to the storage subsystem is shuffled with the drives that are already in the storage subsystem. That is the present invention will perform both off-line drive movement and off-line logical drive addition upon system power-up without loss of data and without intervention from a human.

The inventors understand, as stated earlier in this specification, that at present many storage subsystems require that the hard drives associated with a logical drive unit be placed in the bays of a storage subsystem in ascending order. The inventors note, that the ascending order requirement is not necessary for the present invention, but can be incorporated into the firmware of the array controller circuitry to check to make sure the drives associated with a logical drive are positioned in an ascending order in the storage subsystem bay positions.

Figure 8:
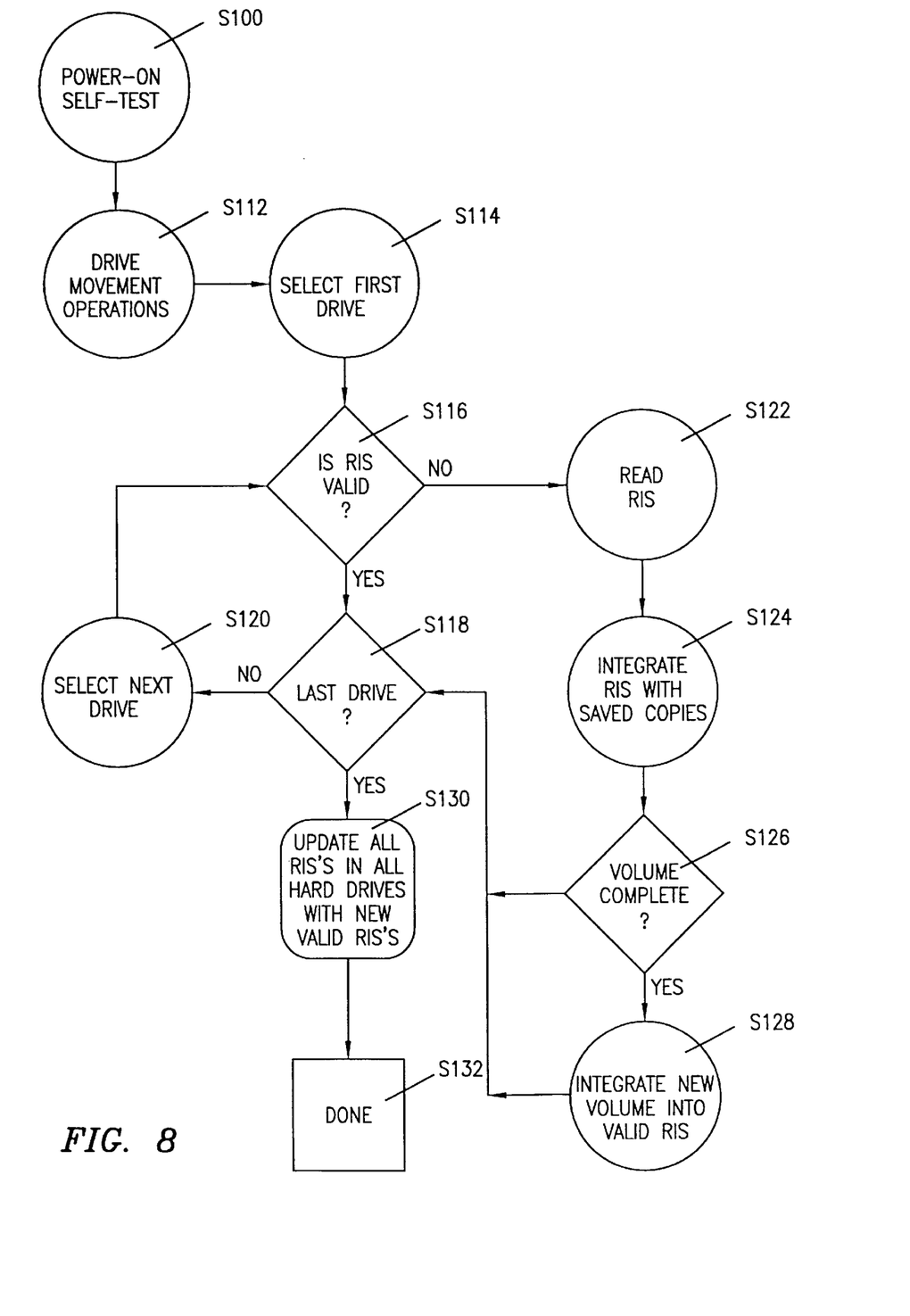
FIG. 8 depicts a flow chart reflecting off-line volume addition of an exemplary embodiment of the present invention.

FIG. 8 depicts a flow chart describing an exemplary off-line volume addition method. In step S100 a power-on self-test takes place. During the power-on self-test all the reserved portions of the hard drives are read to determine a variety of things. One of the tasks accomplished during power-on self-test is to determine whether the controller ID data was created by the array controller that is presently reading the drives. This information will help determine if a new logical drive unit has been added to the storage subsystem. Another aspect that is checked during power-on self-test is what portions of the reserved portion of the hard drives are the same and what is different.

In step S112 the array controller performs an off-line drive movement function such as the one described earlier in this specification. The firmware has therefore determined at this point which drives are part of the "original" configuration and which drives may have been added. A copy of the original configuration information is stored in memory associated with the controller. This memory may be referred to a the "global RIS".

In step S114, the drive in the first position is examined by firmware/hardware. The reserved portion (RIS) of the drive in the first position is checked by a validation scheme. A RIS is determined to be valid if, among other things, the RIS is the same RIS that was created by the present array controller prior to powering down the array (with the exception of possibly drive position number/Id). For example, the RIS could be compared to the global RIS to check if it is identical. If the RIS in the hard drive found in the first position is valid then the system checks to see if the first drive position is the last drive in the storage subsystem in step S118. If it is not the last drive in the storage subsystem then the drive in the next drive position is looked at by the firmware in step S120. The RIS of the next drive is then placed in the validation scheme of step S116, and so on.

If for example, in step S116 the validation scheme determines whether the RIS in the drive being looked at is a valid RIS. That is, the reserved portion of the hard drive indicates one of a variety of things that may indicate that the hard drive was not present when the array controller was powered down. Such information could be that the RIS doesn't match the global RIS, that a different array controller ID/signature is present on the RIS, that the drive volume number is not present in the RIS's of the other hard drives in the storage subsystem or, the RIS is in some significant way different than the any of the RIS's in the other storage subsystem bays.

After determining that the RIS of the hard drive is invalid, then in step S122 the RIS of the hard drive may be read again and stored in the local memory in the array controller. In step S124 the RIS is compared with previously saved RIS's. In this comparison step it is determined whether the present hard drive is part of a logical drive having a RIS that has already been stored or whether the present hard drive is a drive that may be a part of a new logical drive.

In step S126 the system determines if a logical drive has been completed. One way of determining whether the logical drive is complete is to check the RIS portion of each drive in a logical drive. The RIS will indicate which other drives belong with the logical drive and what is the correct ordering of the drives. If the logical drive is complete (e.g. if all the drives are accounted for) then in step S128 information associated with the complete logical drive is integrated into a new valid RIS that will be copied to all the drives in the subsystem after all volume addition determinations are complete (this will explained below). It is then determined whether this was the last drive in step S118.

If in step S126 the logical drive volume is not complete then the program proceeds to step S118 and decides if the physical drive is the last drive in the storage subsystem.

After the program steps through all the physical drives in the storage subsystem it proceeds to step S130 where all the RIS's in all the present hard drives are updated with the new valid RIS which will include all the logical drives that have been discovered as being added or that were present prior to power being returned to the storage subsystem.

It is understood that the flow chart depicted in FIG. 8 is one firmware technique for determining if a logical drive unit (a volume) has been added to a storage subsystem and that variations either small or large to the flow chart can be made to accomplish substantially the same automatic determination of volume addition and updating of associated data.

As a result, the present exemplary embodiment of the present invention allows for the hard drives within a storage subsystem to change position ("be shuffled") and/or have new complete volumes added to the storage subsystem when the power is removed from the storage subsystem, then when power is returned to the storage subsystem, the array controller associated with the storage subsystem can automatically determine the drive movement and/or volume addition changes that have been made to the storage subsystem.

Another exemplary embodiment of the present invention accepts additional logical drives wherein the physical drives within the logical drive have been shuffled. The exemplary embodiment will both determine that a logical drive unit has been added and also determine the correct order of the physical drives.

Although a few preferred embodiments of the invention have been shown and described, it will be appreciated by those skilled in the art that changes may be made in these embodiments without departing from the principles and the spirit of the invention, the scope of which is defined in the appended claims.

What is claimed is:

1. A computer system comprising:
   an array controller;
   a first storage subsystem, connected to said array controller, comprising a plurality of hard drives configured in a first order; and
   said array controller adapted to determine whether said hard drives have been rearranged into a second order within said first storage subsystem, said array controller further adapted to automatically reconfigure said hard drives into said second order and to determine whether the hard drives associated with a logical drive are positioned in non-ascending order in said storage subsystem, said array controller providing repositioning information to a user prescribing other positions for the hard drives so that they will be in an ascending order.

2. The computer system of claim 1, wherein said first order comprises at least a first logical drive unit, and wherein said array controller is further adapted to determine whether a second logical drive unit has been added to said storage subsystem, said array controller further adapted to automatically reconfigure the hard drives in said first logical drive unit and said second logical drive unit to incorporate said second logical drive unit.

3. The computer system of claim 1, wherein each of said plurality of hard drives comprises a reserved storage portion for storing at least configuration information.

4. The computer system of claim 1, wherein said plurality of hard drives are rearranged when a power source is removed from at least one of said storage subsystem and said array controller.

5. The computer system of claim 1, wherein said array controller is connected to a server.

6. The computer system of claim 1, wherein said array controller is connected to a personal computer.

7. A computer system comprising:
   an array controller circuit; and
   a first storage subsystem, connected to said array controller circuit, comprising a plurality of hard drives configured in a first order, said first order including at least one logical drive unit;
   said array controller circuit adapted to determine whether a new logical drive unit has been added to said storage subsystem thereby creating a second order, said first array controller circuit further determining whether said plurality of hard drives, which include said at least one logical drive unit, are positioned in an ascending order in the first storage subsystem's bay positions, if said plurality of hard drives are not in an ascending order, said array controller prescribes a movement of said plurality of hard drive so that they are in an ascending order; said array controller circuit further adapted to automatically reconfigure said at least one logical drive unit and said new logical unit into said second order, said new logical unit comprising at least one hard drive.

8. The computer system of claim 7, wherein said array controller circuit is further adapted to determine whether said plurality of hard drives and said at least one hard drive have been shuffled.

9. The computer system of claim 7, wherein each of said plurality of hard drives and said at least one hard drive have a reserved data portion which can be reconfigured by said array controller circuit.

10. The computer system of claim 7, wherein said array controller circuit is connected to at least one of a server and a personal computer.

11. The computer system of claim 7, wherein said array controller circuit is adapted to determine whether a new logical drive unit has been added after power has been removed from said array controller circuit and then returned to said array controller circuit.

12. A computer system comprising:
 a first storage device;
 a second storage device connected to the first storage device;
 a third storage device connected to the second storage device, wherein the first storage device, the second storage device, and the third storage device are initially arranged in a first configuration and wherein the first storage device, the second storage device, and the third storage device can be arranged in a second configuration;
 an array controller connected to each of the first storage device, the second storage device, and the third storage device; and
 an array controller memory for storing array controller instructions, the array controller instructions configured to cause the array controller to:
  determine whether the first storage device, the second storage device, and the third storage device are in a second configuration, the second configuration being different from the first configuration;
  responsive to the determination that the first storage device, the second storage device, and the third storage device are arranged in a second configuration, determine whether the first storage device, the second storage device, and the third storage device are arranged in an ascending configuration;
  responsive to the determination that the first storage device, the second storage device, and the third storage device are in other than an ascending configuration, generate an error indication; and
  transmit the generated error indication to a user, whereby the user can be notified of an error condition.

13. The storage system of claim 12, wherein the array controller instructions are configured to cause the array controller to:
 calculate repositioning information for the first storage device, the second storage device, and the third storage device;
 wherein the generated error indication includes the calculated repositioning information and wherein the calculated repositioning information provides a configuration for the first storage device, the second storage device, and the third storage device such that the first storage device, the second storage device, and the third storage device are positionable in an ascending configuration based upon the calculated repositioning information.

* * * * *